United States Patent Office 3,275,147
Patented Sept. 27, 1966

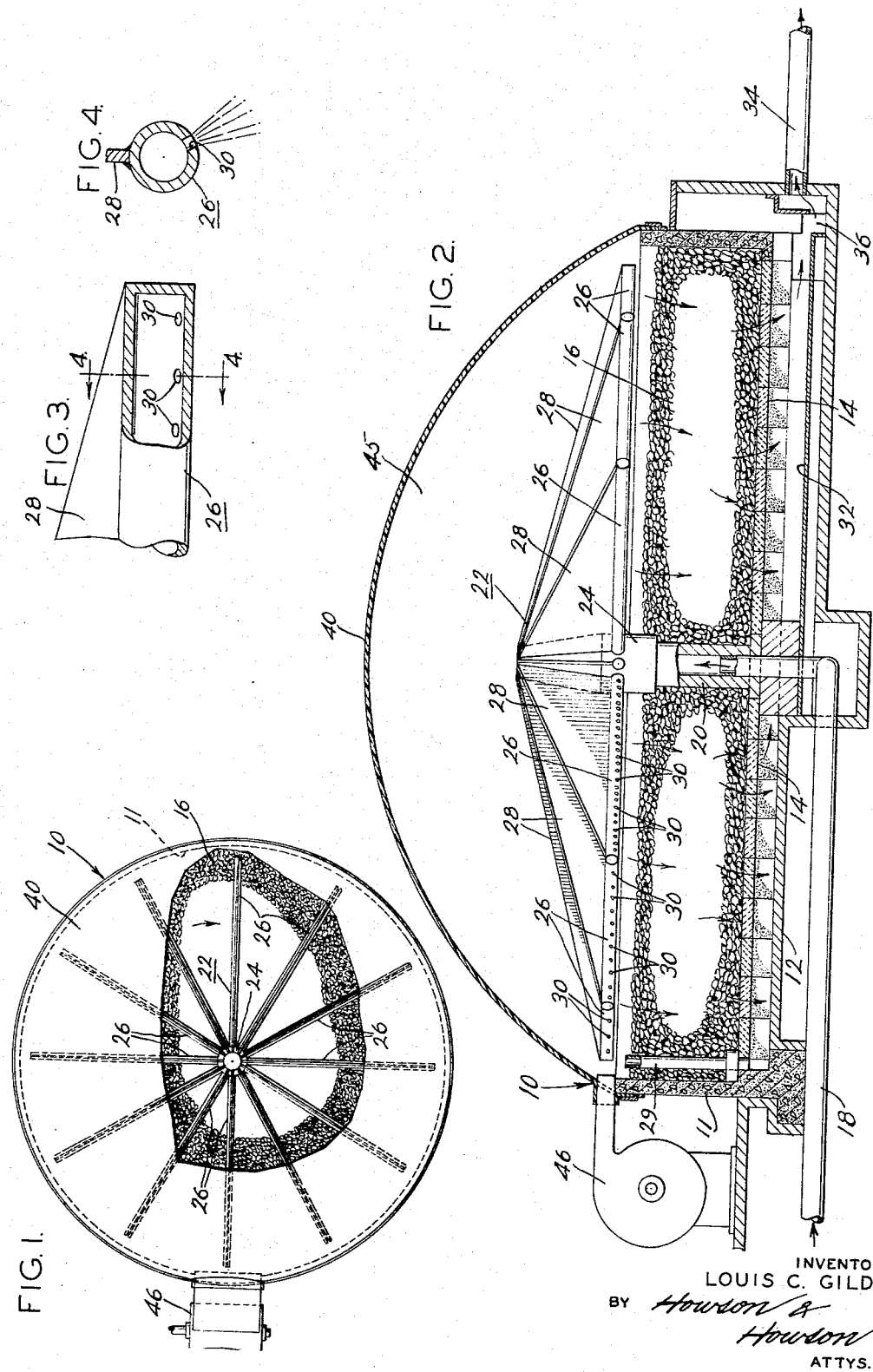

3,275,147
FILTERS
Louis Charles Gilde, Pennsauken, N.J., assignor to Campbell Soup Company, Camden, N.J., a corporation of New Jersey
Filed July 14, 1964, Ser. No. 382,525
1 Claim. (Cl. 210—150)

The present invention relates to improvements in filters for treating waste fluids or sewage.

The present invention has particular application to a type of filter known as a "trickling" filter. These trickling filters conventionally include a bed of gravel of about three to eight feet deep and means for distributing the sewage over the top of the bed whereby upon settling of the sewage through the gravel bed, the organic matter in the sewage is filtered out by absorption and direct metabolism. A serious problem in these conventional trickling filters is the obnoxious odors which it has been found result from incomplete stabilization of the sewage in the filter bed whereby volatiles of an obnoxious character are liberated and since these volatiles are free to escape, there is created a serious odor problem.

Many proposals have been tried to eliminate or substantially reduce these odors produced during the filtering process. For example, it has been proposed to reduce the concentration of waste supplied to the filter bed by slowing down or reducing the flow of sewage through the filter or by diluting the waste sewage with water. These proposals however, have slowed down considerably the filtering process and added considerably to the cost thereof. Other efforts or proposals include recirculation of the waste, the use of a plurality of filters arranged in parallel or series and the elimination of preliminary sedimentation in settling tanks. Still other proposals to reduce obnoxious odors include control of the pH of the waste, aeration of waste before distribution on the filter beds, oxidation of odors by means of a chlorinated top spray and the use of filters to purify the exhaust air. These additional treatments of the waste, and/or the exhausted air obviously increase the cost of the process. Moreover, all of these proposals have only reduced to a small degree the obnoxious odors and have not been successful in completely eliminating the same.

In some instances, these trickling filters have been provided with stationary domes completely covering the filter bed which were made, for example, of concrete and which served primarily to protect the filter against adverse weather conditions. Since these filters are of a comparatively large size, the domes are expensive and hence add considerably to the cost of the entire unit. However, even in these installations, the odor-laden air still rises from the filter bed and must be discharged through an outlet in the dome. Thus, the only advantage of such an arrangement is that the odor-laden exhaust air may be channeled to a less objectionable release point with or without filtration thereof and thus there is not truly a reduction of the obnoxious odors produced during the filtering process.

The present invention provides a novel and effective means for eliminating obnoxious odors resulting from treatment of sewage waste by filtration in a highly economical manner. To this end in accordance with the present invention, there is provided a dome covering the open top of the filter bed, which dome is preferably made of a flexible material such as plastic and means is provided for introducing air under pressure in the space between the top of the filter bed and the dome thereby to support the dome in spaced relation to the top of the filter bed and pressurize the atmosphere above the filter bed. By this arrangement of a pressurized asmosphere the supply of oxygen to the filter material is increased and there is a reversal of air flow downwardly through the filter bed. This reversal of air flow and increased pressure provides better wet scrubbing of the odor-laden air throughout the entire depth of the filter bed whereby the air discharged from the filter bed is relatively odor free. Thus it is clear that the present invention provides a highly economical arrangement for filters for sewage whereby the obnoxious odors heretofore present in filters of this type have been substantially eliminated.

With the foregoing in mind an object of the present invention is to provide a highly effective means for eliminating obnoxious odors arising from treatment of sewage in filters particularly trickling filters.

Another object of the present invention is to provide such odor control by means which are relatively simple and economical.

A further object of the present invention is to provide an odor control means for trickling filters or the like which is readily adaptable to existing trickling filter installations.

These and other objects of the present invention and the various features and details of the construction and arrangement thereof are hereinafter more fully set forth with reference to the accompanying drawings, wherein:

FIG. 1 is a plan view of a trickling filter for sewage constructed in accordance with the present invention;

FIG. 2 is an enlarged transverse sectional view through the filter showing the internal construction thereof;

FIG. 3 is a fragmentary view partially in section of part of the sewage distributing means of the filter; and FIG. 4 is a sectional view taken on lines 4—4 of FIG. 3.

Referring now to the drawing, there is illustrated in FIGS. 1 and 2 a trickling filter 10 embodying the odor control means in accordance with the present invention. Even though the invention is shown and described in connection with a trickling filter, it is to be understood that it has application to other types of filters.

The trickling filter 10 illustrated comprises an upstanding, generally circular outer wall 11 made, for example of concrete, a base 12 and a bottom wall 14 comprised of a plurality of porous drain blocks of inverted U-shaped cross section mounted on the base 12. The filter 10 further includes a bed 16 of filter material such as gravel of from three to eight feet deep.

Sewage is delivered to the filter through an influent pipe 18 to a hollow distribution pipe 20 disposed centrally of the filter bed 16. Mounted on the upper end of the pipe 20 is a rotary distributor 22 having a central hub portion 24 and a plurality of radial arms 26 projecting from the hub portion 24 supported circumferentially of the hub 24 by means of a support structure 28. Each of the arms 26 has a plurality of small openings 30 therein suitably arranged relative to the filter bed so that as the sewage is fed through the system, the discharge of the filter through the openings 30 effects rotation of the rotary distributor 22, thereby to distribute the sewage over the top of the entire bed.

Thus, in the operation of the filter, sewage distributed over the top surface of the filter bed 16 by the rotary distributor 22 trickles down through the gravel filter bed 16 to the tile drain blocks 14. From the tile drain blocks 14, the filtered sewage flows into the main effluent channel 32 in the base 12 and is discharged through effluent pipe 34, a water trap 36 having air relief means, not shown, being provided to separate the treated sewage from the air. An overflow pipe 29 is provided so that if the sewage doesn't pass through the filter fast enough, it will overflow through the pipe 29 rather than jam the whole system. During the course of processing, bacteria which are naturally present in the sewage develop a gelatinous film on the surface of the gravel particles in the bed 16 and as the sewage trickles through the filter bed 16, the bacteria stabilize the organic matter in the sewage both by absorption and direct metabolism, the air in the interstices of the bed of filter material providing the necessary oxygen for the aerobic bacteria which so function in the active film or slime. As noted previously, in conventional filters heretofore known incomplete stabilization of the sewage in the filter bed liberate volatiles of obnoxious character which create the obnoxious odors.

In accordance with the present invention, means is provided for effectively eliminating in a highly economical manner the obnoxious odors produced in the filtering process. More particularly in accordance with the present invention, the region above the filter bed is pressurized so that there is circulation of air downwardly through the filter bed. In the present instance this is accomplished by providing a dome 40 secured at its outer periphery to the upper peripheral edge of the wall 11 so that it completely covers and encloses the top of the filter bed. The dome 40 is preferably made of a flexible material such as plastic and is supported in an erect, cup-shaped manner (see FIG. 2) by introducing air under pressure in the space 45 above the filter bed by, in the present instance, a blower 46 mounted exteriorly of the filter and communicating at its discharge end interiorly of the space 45. By this arrangement, the pressurized air in the space 45 is forced downwardly into and through the filter bed 16 which produces wet scrubbing of the odor-laden air over the filter material. Additionally there is increased biological assimilation of the volatiles present, increased solubility of oxygen in the sewage and increased penetration of oxygen into the active slime. This in turn results in greatly decreased odors without additional treatment of the air discharged. Thus, it is readily apparent that the present invention provide a novel, simple and highly economical means for practically eliminating odors in filtering processes.

While a particular embodiment of the present invention has been illustrated and described herein, it is not intended to limit the invention and changes and modifications may be made herein within the scope of the following claim.

I claim:

A filter for waste fluid material comprising a bed of filter material, means for distributing fluid waste material over the top surface of said bed of filter material, a flexible cover overlying and completely closing the top surface of said bed of filter material, a blower communicating with the space between the cover and the top surface of the filter bed for maintaining air above atmospheric pressure in the space between said cover and the bed of filter material, and a trap for separately discharging filtered waste fluid and air from below the filter bed.

References Cited by the Examiner

UNITED STATES PATENTS

| 651,301 | 6/1900 | Ducat | 210–150 |
| 1,138,634 | 5/1915 | Davidson | 210—80 X |
| 3,176,845 | 4/1965 | Schenk | 210—150 |

MORRIS O. WOLK, *Primary Examiner.*

MICHAEL E. ROGERS, *Examiner.*